United States Patent [19]

Miller et al.

[11] Patent Number: 5,725,769
[45] Date of Patent: Mar. 10, 1998

[54] SOLVENT-RESISTANT MICROPOROUS POLYMIDE MEMBRANES

[75] Inventors: Warren K. Miller; Scott B. McCray; Dwayne T. Friesen, all of Bend, Oreg.

[73] Assignee: Bend Research, Inc., Bend, Oreg.

[21] Appl. No.: 503,809

[22] Filed: Jul. 18, 1995

[51] Int. Cl.$^6$ .............................. B01D 53/22; B01D 71/64
[52] U.S. Cl. ..................... 210/500.39; 95/47; 95/54; 210/490
[58] Field of Search ........................... 210/500.39, 490; 95/54.55; 264/41, 49

[56] References Cited

U.S. PATENT DOCUMENTS

| | | |
|---|---|---|
| 3,925,211 | 12/1975 | Schumann et al. |
| 4,071,590 | 1/1978 | Strathmann. |
| 4,113,628 | 9/1978 | Alegranti. |
| 4,475,662 | 10/1984 | Makino et al. |
| 4,717,393 | 1/1988 | Hayes ............................... 95/54 |
| 4,929,405 | 5/1990 | Kohn ..................... 210/500.39 X |
| 4,932,983 | 6/1990 | Hayes ............................... 95/54 |
| 4,952,319 | 8/1990 | Yanaga et al. |
| 4,959,151 | 9/1990 | Nakatani et al. |
| 4,978,573 | 12/1990 | Kohn. |
| 5,034,024 | 7/1991 | Hayes ............................... 95/54 |
| 5,042,993 | 8/1991 | Meier et al. ...................... 95/54 |
| 5,061,298 | 10/1991 | Burgoyne, Jr. et al. ........... 95/54 |
| 5,066,760 | 11/1991 | Seidl et al. ...................... 528/338 |
| 5,198,316 | 3/1993 | Wernet et al. ................... 210/651 |
| 5,202,411 | 4/1993 | Itatani ............................. 528/353 |
| 5,248,319 | 9/1993 | Ekiner et al. .................... 95/54 |
| 5,317,082 | 5/1994 | Beuhler et al. .................. 528/353 |

*Primary Examiner*—John Kim
*Attorney, Agent, or Firm*—Chernoff, Vilhauer, McClung & Stenzel, LLP

[57] ABSTRACT

An asymmetric microporous membrane with exceptional solvent resistance and highly desirable permeability is disclosed. The membrane is made by a solution-casting or solution-spinning process from a copolyamic acid comprising the condensation reaction product in a solvent of at least three reactants selected from certain diamines and dianhydrides and post-treated to imidize and in some cases crosslink the copolyamic acid. The membrane is useful as an uncoated membrane for ultrafiltration, microfiltration, and membrane contactor applications, or may be used as a support for a permselective coating to form a composite membrane useful in gas separations, reverse osmosis, nanofiltration, pervaporation, or vapor permeation.

22 Claims, No Drawings

SOLVENT-RESISTANT MICROPOROUS POLYMIDE MEMBRANES

This invention was made with government support under Contract Nos. DE-FG0392ER81420 and DE-FG0391ER81230, awarded by the U.S. Department of Energy. The government has certain rights in this invention.

BACKGROUND OF THE INVENTION

Microporous flat sheet and hollow fiber membranes are well known in the art. See for example U.S. Pat. Nos. 4,230,463 and 4,772,391. Such membranes are routinely made by a solution-casting process (flat sheets) or by a solution-spinning process (hollow fibers), wherein the polymer is precipitated from a polymer/solvent solution. Conventional polymers used for microporous membrane formation via a solution-precipitation technique are not resistant to the solvents used to form the polymer solution for the casting or spinning fabrication, or to solvents of similar strength since such solvents dissolve or swell the polymer. Thus, membranes made from conventional polymers cannot be used to treat feed streams containing solvents or other aggressive chemicals.

The manufacture of chemically resistant membranes from polyimides is well known in the art. See for example, U.S. Pat. Nos. 4,959,151, 4,474,662, 4,978,573, UK Patent Application 2,102,333A. However, although these membranes are reported to be chemically resistant, they are formed from a solvent solution, and are not subsequently treated to improve their solvent resistance. Accordingly, such membranes are not tolerant to the solvent used in forming the membrane or to solvents of similar strength and will in fact dissolve if contacted with such chemicals.

U.S. Pat. Nos. 3,925,211 and 4,071,590 and Strathman, in 26 Desalination 85 (1978), all disclose a process for making asymmetric membranes from a solvent soluble film-forming prepolymer and then converting it into an insoluble polymeric final membrane product. Specific examples show the preparation of a polyimide membrane from a polyamic acid prepolymer. However, no guidelines are given as to the specific structures of the polyimides that result in a solvent-insoluble membrane that also has a morphology that yields acceptable permeability. In addition, all of the polymers disclosed are homopolymers and there is no suggestion that the use of copolymers is desirable or even possible. The homopolymers disclosed have either a high glass transition temperature (Tg) or solvent resistance, but not both.

U.S. Pat. No. 4,952,319 discloses the preparation of a membrane from a copolyimide made from benzophenone tetracarboxylic dianhydride (BTDA), 4,4' methylene dianaline, and diamino toluene. Although this membrane is reported to have excellent chemical resistance, it must be soluble at room temperature to form a good membrane.

U.S. Pat. No. 4,113,628 discloses asymmetric polyimide membranes prepared from the corresponding polyamic acid which is then cyclized to the polyimide using a chemical cyclizing agent. The asymmetric membranes produced by the method of this patent are either soluble or insoluble in organic solvents depending upon the nature of the starting dianhydrides or diamines (Col. 2, lines 50–53). However, no guidelines are given as to how to select the starting dianhydrides or diamines to obtain a solvent resistant membrane.

It is also recognized that highly solvent-resistant structural composite materials (not membranes) can be formed by high-temperature treatment of polyamic acids to form cross-linked polyimides. Such polymers act as thermosetting resins in that, during such heat treatment, the polymer softens and is liquid for a significant time prior to cross-linking and resolidification. Thus, although such treatment of a porous membrane formed by a solution-spinning process is expected to convert the polyamic acid to a cross-linked polyimide having improved solvent resistance, such treatment also tends to destroy its favorable permeability by collapse of the pore structure when the membrane softens during heat treatment.

Thus, it is clear that while the prior art has recognized that membranes with increased resistance to solvents can be made from polyimides, it has not been recognized that only a select class of polyimides with certain key characteristics, following a heat treatment step, will result in a membrane that is not only solvent-resistant but that retains the microporous morphology imparted during fabrication that yields the needed permeability. This need for a membrane that can be formed by conventional solution-spinning or solution-casting and that is microporous, highly permeable, and that can be converted to a form that has a very high degree of solvent resistance without destroying its microporous morphology and corresponding desirable permeability, is met by the present invention, which is summarized and described in detail below.

SUMMARY OF THE INVENTION

The present invention provides a microporous membrane with exceptional solvent-resistance and high permeability. Another aspect of the present invention is the discovery of criteria for selecting the materials used to form such membranes.

In its broadest aspect, the invention comprises a microporous membrane formed from a copolyimide, wherein the copolyimide comprises the imidization reaction product of the condensation reaction product formed by a solution-spinning or -casting process in a solvent of at least three reactants selected from (1) a diamine A or A', and (2) a dianhydride B or B', wherein A, A', B, and B' are selected so that (1) the homopolymer formed from the condensation reaction of A with B, following heat treatment at $\geq 250°$ C., has a glass-transition temperature $\geq 300°$ C., and (2) the homopolymer formed from the condensation reaction of A' with B', following heat treatment at $\geq 250°$ C., has a resistance to the solvent used to form a microporous membrane that is characterized by absorption of $\geq 50$ wt % after soaking the nonporous polymer in the solvent in pure form at 20° C. for at least 24 hours.

The key advantages of such microporous hollow fiber membranes formed by the process of the present invention are that (1) one component (A+B) provides a sufficiently high glass transition temperature to permit retention of the microporous structure of the precursor polyamic acid fiber when converted by heat treatment to the polyimide form; and (2) another component (A'+B'), following post-treatment such as by heat, provides exceptional solvent-resistance. In addition, when the component (A'+B') is converted to the polyimide form, in some cases, cross-linking is induced, which is another favorable characteristic for stability and solvent-resistance.

DETAILED DESCRIPTION OF THE INVENTION

The following definitions are used herein.

By "solvent resistance" is meant that the fabricated membrane, when in the form of a hollow fiber, retains 10% or more of its burst pressure after exposure for 24 hours at room temperature to the solvent used to make the membrane, and further that the polymer used to make the membrane gains less than 50% of its initial weight upon exposure in nonporous form for 24 hours at room temperature to the solvent used to make the membrane. (The reason that solvent resistance is tested using the nonporous form is that, in a microporous form, a membrane tends to imbibe liquid solvent within its pores even if the polymer itself does not absorb the solvent by swelling, resulting in a false reading in terms of weight gained by absorption of solvent.)

A 10% retention of burst pressure means that the burst pressure of the fabricated membrane in hollow fiber form, after exposure to pure solvent, is greater than or equal to one tenth that of the fiber before exposure to the solvent.

"Permeance" is the amount of gas transported across a membrane of unit area and unit thickness, in response to a unit driving force.

In contrast to the procedures of the prior art, it has now been found that microporous membranes, with exceptional solvent resistance can be made by the proper selection of the polymer used to form the membrane, coupled with proper post-fabrication treatment. Specifically, it has been discovered that copolyimides, comprising the imidization reaction product of the condensation reaction product in a solvent of at least three reactants selected from (1) a diamine A or A', and (2) a dianhydride B or B', lead to membranes with exceptional solvent resistance.

The choice of A, A', B and B' used to form the copolyimides of the present invention may be made on the basis of the properties of the homopolymers formed by reacting A with B, and A' with B'. The homopolymers are made by first reacting the diamine and dianhydride in a solvent to form a solution of the homopolyamic acid. The solvent is chosen such that the polyamic acid remains soluble upon polymerization. The homopolyamic acid can be converted to the homopolyimide by a variety of known techniques including treatment with an anhydride (Wilson et al., Polyimides, pp. 28-29 (1990) or by heat treatment (Ibid, pp. 16-18). The homopolymer properties are defined for the case where the polyamic acid is converted to the polyimide by gradual heat treatment to first remove solvent and then imidize the polymer and finally to cross-link the polymer. The final temperature attained in such heat treatment is ≧250° C., and can be as high as 350° to 400° C. Such heating can be done in the presence of oxygen, such as air, or in an inert atmosphere, such as nitrogen or argon.

It has been found that A, A', B and B' must be selected so that (1) the homopolymers formed from the condensation reaction of A with B, following heat treatment at ≧250° C., have a glass-transition temperature ≧300° C., and (2) the homopolymers formed from the condensation reaction of A' with B', following heat treatment at ≧250° C., have a resistance to the solvent used in the spinning of the hollow fibers that is characterized by absorption of ≦50 wt % after soaking the polymer in the solvent in pure form at 20° C. for at least 24 hours. A microporous hollow fiber membrane can be made from such a copolyimide by solvent-spinning a solution of the amic acid or partially imidized amic acid, followed by imidization, preferably by heat treatment to ≧250° C. Such a hollow fiber membrane possesses exceptional solvent resistance and retains the desirable microporous morphology imparted in the solution-spinning or -casting process. Depending on the specific conditions of the solution-spinning or -casting process, the microporosity of the membrane can be either symmetric or asymmetric. For many applications, an asymmetric microporous morphology is preferred.

The homopolymers formed from the condensation reaction of A with B, following heat treatment at ≧250° C., have a glass-transition temperature ≧300° C. with the repeating structure of the Formula I:

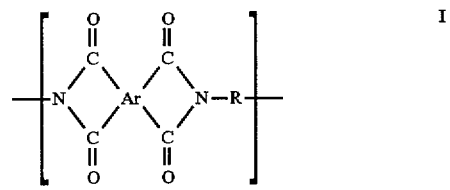

wherein R is selected from

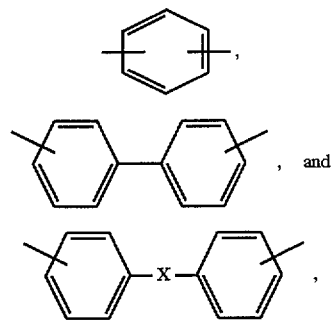, and

X is selected from —O—,

—SO$_2$—, and —CH$_2$—, Ar is selected from

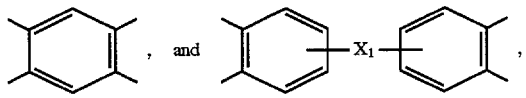

and X$_1$ is selected from —O—,

and —SO$_2$—.

The homopolymers formed from the imidized condensation reaction of A' with B', following heat treatment at ≧250° C., have a resistance to the solvent used in the solvent-spinning or -casting that is characterized by absorption of ≧50 wt % after soaking the non-porous polymer in the solvent in pure form at 20° C. for at least 24 hours have the repeating structure of formula II.

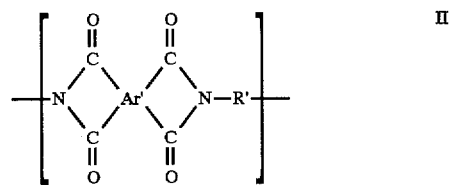

wherein R' is selected from

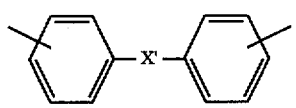

X' is selected from —O—,

—SO$_2$—, —CH$_2$—, and

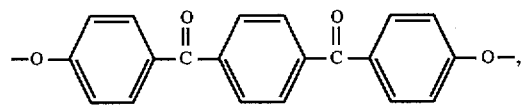

Ar' is selected from

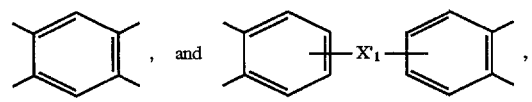

and X$_1$ is selected from —O—,

and —SO$_2$—.

To form the copolyimide, a least three reactants are selected from A, A', B, and B', such that they meet the criteria listed above. Generally, the ratio of the number of moles of A plus B to the number of moles of A' plus B' should be selected such that the glass-transition temperature of the heat-treated copolymer is approximately ≧300° C., and the copolymer gains less than 50% of its initial weight upon exposure in nonporous form for 24 hours at room temperature to the solvent used in the solution-spinning or -casting fabrication of the membrane. It has been found that this ratio is usually in the range of 0.1 to 10, and is preferably in the range of 0.2 to 5.

The basic procedure for forming polyimides (and copolyimides) is well known in the art (see for example "Polyimides," by C. E. Sroog, in *Prog. Polym. Sci.* Vol. 16, p 561–694, 1991). Generally, the diamine and dianhydride, along with sufficient end-capping agent, are added to a solvent and allowed to react at ambient temperature to form a polyamic acid. The molar ratio of the total amount of diamine to the total amount of dianhydride, and the amount of end-capping agent are adjusted to obtain a molecular weight in the desired range. Generally, the molar ratio of diamine to dianhydride will range from 0.90 to 1.1.

The solvent used in the synthesis of the polyamic acid is generally a polar, aprotic solvent. Preferred solvents include dimethylformamide (DMF), dimethylacetamide (DMAC), dimethylsulfoxide (DMSO) and N-methyl-2-pyrrolidone (NMP).

The molecular weight of the copolymer must be sufficiently high to provide good properties for the final polyimide, yet sufficiently low to yield a sufficiently low viscosity (typically less than 100,000 CP) for the fiber-spinning solution. Generally, the molecular weight of the copolymer should be greater than about 10,000 daltons, but less than about 500,000 daltons. To achieve a molecular weight in this range requires that the molar ratio of the anhydride (A+A') to diamine (B+B') be in the range of 0.95 to 1.05.

Thus, the molecular weight can be controlled by having either a slight excess of diamine or a slight excess of dianhydride. It is understood that monomer ratios very close to 1 (i.e., 0.995 to 1.005) may lead to polymer with a very high molecular weight. Such polymers are unsuitable for the spinning of microporous membranes in the form of hollow fibers as the polymer solubility becomes too low. Typically, the molecular weight must be low enough to allow at least 5 wt % and preferably at least 10 wt % polymer to be dissolved in the membrane-forming solvent. Even when the diamine and dianhydride added to the reaction mixture are in the nominal ratio of 1.00 (which theoretically should have a nearly infinite molecular weight), the molecular weight of the polymer may be acceptable due to impurities in the reactants, to terminating reactions, and to the presence of a monofunctional endcapper (e.g., a monoamine, or a monoanhydride).

The concentration of solids in the solution of the polyamic acid should be in the range of 10 to 30 wt % as this concentration allows the solution to be used in a fiber-spinning process without isolation of the polymer. Preferably, prior to spinning, additives such as non-solvents, pore-formers and surfactants are added to the polyamic acid solution to obtain the desired microporosity of the product fiber.

The asymmetric, microporous membrane of the present invention in hollow fiber form may be formed from the polyamic acid using standard solution-phase fiber-spinning techniques which are known in the art (see U.S. Pat. No. 4,772,391). The general procedure is as follows.

First, a poor solvent or non-solvent, known to be useful as a pore-former, is added to the solution of the polyamic acid in the solvent to form a fiber-spinning solution. The pore former may be selected from a wide range of compounds. It has been found that the most effective non-solvents are alcohols, such as n-propanol, n-butanol, ethylene glycol and glycerol. Polymeric alcohols can also be used, such as polyethylene glycol, and polypropylene glycol. To improve other properties of the spun fibers, such as increasing their surface porosity and overall permeability, other additives may be added such as water-soluble polymers or surfactants. Exemplary water-soluble polymers include polyvinyl-pyrrolidinone, polyvinyl alcohol and polyethyleneimine. Exemplary surfactants include laurylsulfate and the "Pluronic" series of surfactants from BASF Corporation of Parsippany, N.J.

Second, the fiber-spinning solution is extruded through the orifice of a tube-in-orifice spinneret, while injecting a coagulating solution through the tube. The coagulating solution generally consists of a mixture of solvents, non-solvents and surfactants. The pore size and porosity of the inside surface of the hollow fiber can be adjusted by varying the ratio of solvent to non-solvent, as well as by varying the type of solvent and non-solvent used.

Third, the polymer solution/coagulating solution combination is drawn into a coagulating bath where it precipitates, forming a hollow fiber of the polyamic acid. The coagulating bath generally consists of a mixture of solvents, non solvents, and surfactants. The precipitated fiber is then thoroughly rinsed to remove residual solvents, and then allowed to dry, resulting in a dry microporous hollow fiber of the polyamic acid.

The microporous hollow fiber is converted into the solvent-resistant copolyimide using a step-wise thermal annealing procedure. This generally consists of heating the fiber to temperatures above about 200° C. in a series of steps. Such gradual heating first drives off residual solvent in the range of 100° C. to 200° C., then causes cyclization of the amic acid groups to form the copolyimide in the range of 200° C. to 250° C. At temperatures ≧250° C., in some cases, further reaction may take place that results in cross-linking of the copolyimide, which further enhances solvent-resistance, resulting in a hollow fiber with exceptional solvent resistance. Critical to the successful fabrication of the microporous, solvent-resistant membranes (flat sheet or hollow fibers) is the use of a special class of copolymers. Typically highly solvent-resistant homopolyimides have Tg values below 300° C. Upon heat treatment of the solvent-fabricated microporous membrane in a manner similar to that of the present invention, unless appropriate selection of copolymers is made, the pore structure is adversely affected and may entirely disappear due to softening and flow of the polymer. Although some homopolyimides have higher Tg values (>300° C.), such polyimides generally are not sufficiently solvent-resistant to be acceptable, that is, they swell by more than 50 wt % when exposed to the pure solvent used in spinning or casting. Thus, it has been found that by copolymerizing monomer units that each alone form (1) homopolymers that are highly solvent-resistant and (2) homopolymers that have a high Tg (>300° C.), a microporous membrane can be formed and post-treated by heat, to yield a membrane that is both highly solvent-resistant and highly permeable due to retention of its microporous structure. Retention of the membrane's microporous structure may be observed by scanning electron microscopy, and may also be confirmed from the membrane's permeance to gases, which is very high relative to the permeance of nonporous membranes. As still further evidence of retention of microporosity, it has been observed that membranes fabricated in accordance with the invention exhibit relatively high permeance to nitrogen and relatively low selectivity for oxygen over nitrogen (on the order of less than 2).

The asymmetric microporous solvent-resistant membranes have a multitude of uses. As an uncoated membrane, uses include the following: as an ultrafiltration or microfiltration membrane, as a membrane contactor/phase separator, and as a support for a liquid membrane. A selective coating can also be applied to either the inside or outside surface of the membrane, forming a composite membrane. Uses for coated membranes include the following: as a gas separation membrane, as a reverse osmosis or nanofiltration membrane, as a pervaporation membrane, as a vapor permeation membrane, as an ion-exchange membrane and as a dialysis membrane. The selective coating may be cross-linked, resulting in a composite membrane that has exceptional chemical resistance, permitting successful, long-term use in applications such as removal of organics from water, organic vapor separations, the recovery of volatile organic vapors from various gas streams including air and the treatment of natural gas or other gas streams that contain organic vapors. A particular advantage of the solvent-resistant membranes of the present invention is that the solvent used to apply the coating will not damage the support fiber, thus providing much latitude in the choice of solvent for application of the selective coating.

EXAMPLE 1

Preparation of the Homopolymer from PMDA and ODA

To a 1-liter, 3-neck flask equipped with an overhead stirrer and a nitrogen sparge was added 640 g of anhydrous NMP and 76.3 g (0.38 mol) of 4,4'-oxydianiline ("ODA"). The mixture of 81.45 g (0.37 mol) of pyromellitic dianhydride ("PMDA") and 2.26 g (0.015 mol) of phthalic anhydride (an end-capping agent) was added, forming a reaction solution with a PMDA/ODA molar ratio of 0.98. The flask was sealed and its contents were stirred overnight. Initially, the flask was immersed in ice water to retard the exothermic polymerization reaction; the reaction solution initially rose to 20° C., then dropped to near 0° C. Thereafter, it was permitted to slowly rise to room temperature overnight. This resulted in the formation of a PMDA/ODA polyamic acid solution containing 20 wt % solids. The Brookfield viscosity of the polyamic acid solution at 30° C. was 10,000 cP.

EXAMPLE 2

Preparation of the Homopolymer from BTDA and ODA

To a 1-liter, 3-neck flask in an ice bath and equipped with an overhead stirrer and a nitrogen sparge was added 640 g of NMP and 61.38 g (0.31 mol) of ODA. When the temperature dropped to about 0° C., a mixture of 96.8 g (0.30 mol) 3,3',4,4'-benzophenone tetracarboxylic acid dianhydride ("BTDA") and 1.81 g (0.012 mol) of phthalic anhydride (an end-capping agent) was added and the flask was sealed and its contents stirred and allowed to rise to room temperature overnight. This resulted in the formation of a BTDA/ODA polyamic acid solution containing 20 wt % solids and having a molar ratio of BTDA to ODA of 0.98. The Brookfield viscosity of the polyamic acid solution at 30° C. was 15,000 cP.

EXAMPLE 3

Preparation of the Copolymer from BTDA/PMDA and ODA

To a 2-liter resin kettle in an ice bath and equipped with an overhead stirrer and a nitrogen sparge was added 1033 g of NMP and 108.09 g (0.54 mol) of ODA. Next, 2.0 g (0.014 mol) of phthalic anhydride (an end-capping agent) was added. Then, 104.82 g (0.325 mol) of BTDA and 47.00 g (0.215 mol) of PMDA were added in three portions over a 3-hour period. The mixture was then stirred overnight, resulting in the formation of a BTDA/PMDA/ODA copolyamic acid solution containing 20 wt % solids. The molar ratio of BTDA/ODA to PMDA/ODA was 1.5, while the molar ratio of total anhydride (PMDA+BTDA) to ODA was 1.00. The Brookfield viscosity of the copolyamic acid solution at 30° C. was 35,000 cP.

EXAMPLE 4

Solvent Resistance of Dense Polyimide Films from the PMDA/ODA Polyamic Acid Solution To evaluate solvent resistance of the membranes of the present invention, a thin, dense film was cast on a glass plate from the polyamic acid solution of Example 1 using a casting knife with a blade gap set at 0.4 mm. The thin film was allowed to dry for 24 hours in air, at which time the film was no longer tacky. The thin film was then annealed under a nitrogen atmosphere according to the following schedule: 1 hour at 100° C., 1 hour at 200° C., and 1 hour at 300° C. The glass transition temperature of fully imidized PMDA/ODA polyimide is about 370° C.

Samples of the PMDA/ODA polyimide were then soaked in pure NMP for 10 days at room temperature. The sample swelled in the NMP, showing a total weight gain of 22%, indicating that the PMDA/ODA homopolyimide is not solvent-resistant.

EXAMPLES 5 AND 6

Solvent Resistance of Dense Polyimide Films from the Homopolymers BTDA/ODA and the Copolymer PMDA/ODA and BTDA/PMDA/ODA Samples of the BTDA/ODA polyamic acid and the BTDA/PMDA/ODA copolyamic acid were cast into flat sheets and imidized and soaked in pure NMP for 10 days at room temperature, using the same procedure used in Example 4. The glass-transition temperatures and weight gain of the polyimide films are given in Table 1. The results of this experiment indicate that the BTDA/ODA polyimide and the BTDA/PMDA/ODA copolyimide showed virtually no weight gain when exposed to NMP, indicating these polyimides have high solvent-resistance.

TABLE 1

| Example | Polyimide | Glass-Transition Temperature (°C.) | Weight Gain After Exposure to Pure NMP for 10 days at Room Temperature (wt %) |
|---|---|---|---|
| 4 | PMDA/ODA homopolyimide | 370 | 22 |
| 5 | BTDA/ODA homopolyimide | 279 | 0 |
| 6 | BTDA/PMDA/ODA copolyimide | 305 | 0 |

EXAMPLE 7

Preparation of Asymmetric Microporous Hollow Fibers

A solution of a copolyamic acid was prepared using the procedure outlined in Example 3. Glycerol was slowly added to this solution as a non-solvent until the concentration of glycerol in the final solution was 25 wt %, thus forming a fiber-spinning solution. This solution was then extruded through a tube-in-orifice spinneret using a solution of 40 wt % methanol in water as the internal coagulation solution. The fiber was drawn into a coagulation bath consisting of 100% water, where it precipitated, forming a hollow fiber. The hollow fiber was then rinsed in isopropyl alcohol and air dried for several hours.

The polyamic acid hollow fiber was then imidized and cross-linked by placing the fiber in a nitrogen atmosphere and annealing using the following regimen: 1 hour at 100° C., 1 hr at 200° C., and 1 hr at 300° C. The resulting polyimide hollow fiber had an internal diameter of 218 µm and a wall thickness of about 85 µm. The fiber burst at a pressure of 33 atm. The permeance of the fiber to dry nitrogen was 130 Nm$^3$/m$^2$.hr.atm, and the fiber had a selectivity for oxygen over nitrogen of 0.9. The microporous morphology of the fiber was examined by scanning electron microscopy before and after heat treatment and exhibited virtually no change in the pore structure.

Samples of the fiber were soaked for 72 hours in pure solvents. The results of these tests, shown in Table 2, indicate that the fiber has exceptional solvent resistance.

TABLE 2

| Solvent | Burst Pressure After Exposure for 72 hours at Room Temperature (atm) | Retention of Burst Pressure (%) |
|---|---|---|
| None (before exposure) | 33 | 100 |
| Gasoline | 32 | 98 |
| Toluene | 23 | 71 |
| Benzene | 23 | 71 |
| Methanol | 31 | 93 |
| Ethanol | 29 | 88 |
| Acetone | 27 | 81 |
| Methylene Chloride | 20 | 60 |
| DMAC | 22 | 67 |
| NMP | 21 | 62 |

EXAMPLE 8

Preparation of a Copolymer from BTDA/PMDA and ODA

To a 3-liter resin kettle immersed in an ice bath and equipped with an overhead stirrer and a nitrogen sparge was added 1875.58 ml dimethylformamide (DMF) and 316.96 g ODA (1.58 mol). After stirring for 30 minutes, 303.04 g BTDA (0.94 mol) and 136.73 g PMDA (0.63 mol) were mixed and added in five increments: the first approximately 104 g portion was added at 9:45 a.m., the second 104 g portion was added at 9:55 a.m., the third 104 g portion was added at 10:10 a.m., and the fourth 104 g portion was added at 10:25 a.m. The remaining BTDA/PMDA (about 22 g) and 9.38 g (0.063 mol) phthalic anhydride were dissolved in about 100 ml of DMF and added to the polymer solution at about 10:40 a.m. The mixture was stirred overnight, during which time the water bath was allowed to slowly come up to room temperature. At 6:00 a.m. the solution was transferred to a storage container and sealed under nitrogen. At the time it was sealed the viscosity of the solution was 83,000 cps. The molar ratio of PMDA to BTDA was 0.67, and the molar ratio of total dianhydride (PMDA+BTDA) to ODA was 0.99.

EXAMPLE 9

Preparation of Asymmetric Microporous Hollow Fibers

A fiber-spinning solution was prepared by slowly adding glycerol at a rate of about 5 ml/min to the polyamic acid solution of Example 8 with constant stirring until the glycerol concentration was 29.3 wt %. The nominal polymer concentration in the resulting solution, assuming 100% yield of polyamic acid in the polymerization reaction of Example 8, was 20.5 wt %.

The resulting solution was then stirred for 6 hours and allowed to stand in a sealed container overnight at ambient temperature. The solution was then heated to 45° C. and filtered through a 20 µm polypropylene filter while transferring the same to a reservoir held at a pressure of 25 inches of vacuum. The viscosity of the solution at 30° C. was 78,000 cps. The fiber-spinning solution was then extruded through a tube-in-orifice spinneret at 40° C. using a solution of 37 wt % methanol and 63 wt % water as the internal coagulation solution. The hollow fiber formed by this extrusion was drawn into a coagulation bath at 30° C. consisting of 18 g/liter Triton X100 surfactant (Manufactured by Union Carbide Chemical and Plastics Co., Danbury, Conn.) in water. The resulting solidified hollow fiber was then rinsed in isopropylalcohol for about 30 minutes, drained and air-dried for about two hours.

The dried polyamic acid hollow fiber was then heat-treated to remove solvent, imidize the polyamic acid, and cross-link the resulting polyimide by placing the fibers in a nitrogen atmosphere one hour at 100° C., one hour at 200° C., one-half hour at 280° C., and one hour at 300° C.

The resulting microporous fiber had an average internal diameter of 254 μm and an average wall thickness of 70 μm. The fibers had an average burst pressure of 815 psig. The microporosity of the fibers was indicated by their high nitrogen permeance of 79 Nm$^3$/m$^2$.hr.atm, and their low selectivity toward oxygen over nitrogen of 0.9. The porosity of the fiber was also viewed by scanning electron microscopy before and after heat treatment and exhibited no visible change in pore structure.

The terms and expressions which have been employed in the foregoing specification are used therein as terms of description and not of limitation, and there is no intention in the use of such terms and expressions of excluding equivalents of the features shown and described or portions thereof, it being recognized that the scope of the invention is defined and limited only by the claims which follow.

What is claimed is:

1. A microporous membrane comprising a copolyimide, said microporous membrane being formed by a process selected from the group consisting of solution-casting and solution-spinning, wherein said copolyimide comprises the imidization reaction product of the diamine/dianhydride condensation reaction product in a solvent of at least three reactants selected from the group consisting of:

(a) two diamines A and A' and
   (b) two dianhydrides B and B' wherein A, A', B, and B' are selected so that
   the homopolymer formed from the reaction of A with B, following heat treatment at ≧250° C., has a glass-transition temperature of ≧300° C.,
   the homopolymer formed from the imidization condensation reaction of A' with B', following heat treatment at ≧250° C., has a resistance to said solvent that is characterized by absorption of ≦50 wt % of said solvent in pure form at 20° C. for at least 24 hours, and
   wherein either said two diamines A and A' or said two dianhydrides B and B', but not both, may be the same, said membrane having
   a nitrogen permeance greater than 1 Nm$^3$/m$^2$.hr.atm, and
   a selectivity for oxygen over nitrogen of less than 2.

2. The membrane of claim 1, having an asymmetric microporous morphology.

3. The membrane of claim 1, having a symmetric microporous morphology.

4. The membrane of claim 1 wherein the form of the membrane is a flat sheet.

5. The membrane of claim 1 wherein the form of the membrane is a hollow fiber and has a retention of at least 10% of its burst pressure when soaked for at least 24 hours at 20° C. in said solvent.

6. The membrane of claim 5 having a retention of more than 25% of its burst pressure.

7. The membrane of claim 5 having a retention of more than 50% of its burst pressure.

8. The membrane of claim 5 having a retention of more than 90% of its burst pressure.

9. The membrane of claim 1 wherein said solvent is selected from the group consisting of methylene chloride, dimethylacetamide, N-methylpyrrolidinone, dimethylformamide, acetone, and a phenol.

10. The membrane of claim 9 wherein said solvent is a phenol and is selected from the group consisting of phenol, chlorinated phenol, cresol, chlorinated cresol, and resorcinol.

11. The membrane of claim 1 wherein said nitrogen permeance is greater than 5 Nm$^3$/m$^2$.hr.atm.

12. The membrane of claim 1 wherein said nitrogen permeance is greater than 20 Nm$^3$/m$^2$.hr.atm.

13. The membrane of claim 1 wherein said copolyimide includes at least one repeating structure of the formula I

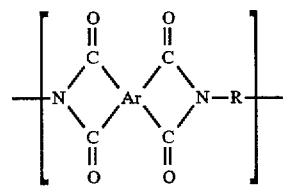

where R is selected from the group consisting of

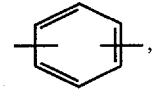

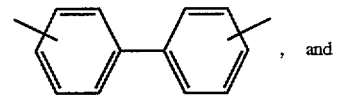, and

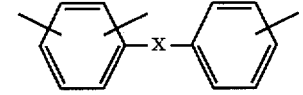,

X is selected from the group consisting of —O—,

—SO$_2$— and —CH$_2$—, Ar is selected from the group consisting of

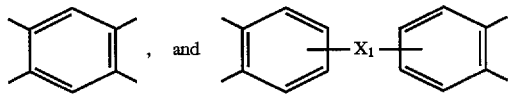

X$_1$ is selected from —O—,

and —SO$_2$—;

and wherein said copolyimide includes at least one repeating structure of the formula II

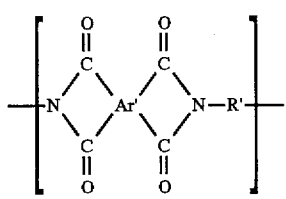

wherein R' is

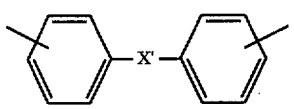

X' is selected from the group consisting of —O—,

—SO$_2$—, —CH$_2$—, and

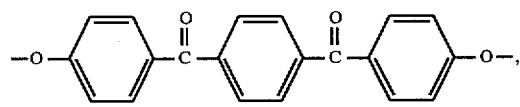

Ar' is selected from the group consisting of

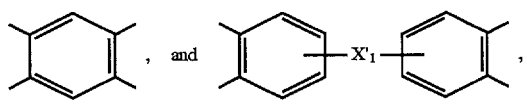

and X'$_1$ is selected from the group consisting of —O—,

and —SO$_2$—.

14. The membrane of claim 13 wherein the molar ratio of formula I to formula II is from 0.1 to 10.

15. The membrane of claim 13 wherein the molar ratio of formula I to formula II is from 0.2 to 5.

16. The membrane of claim 13 wherein formula I is

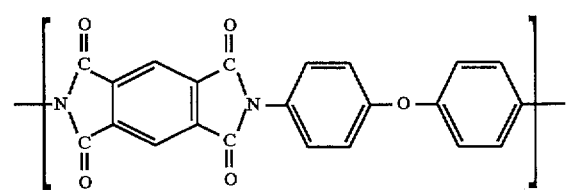

17. The membrane of claim 13 wherein formula II is

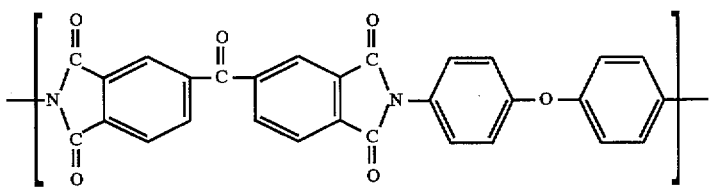

18. The membrane of claim 13 wherein formula I is

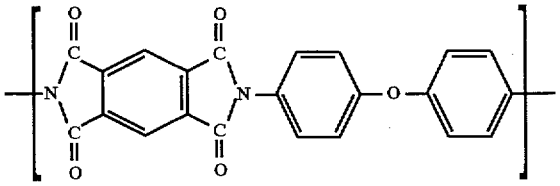

and wherein formula II is

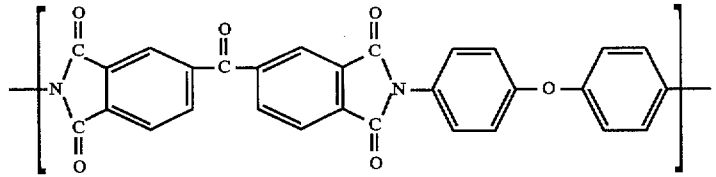

19. The membrane of claim 18 wherein the molar ratio of formula I to formula II is between 0.5 and 2.

20. A composite membrane comprising
(a) an asymmetric microporous membrane support formed from a copolyimide, said copolyimide comprising the imidization reaction product of the condensation reaction product in a solvent of at least three reactants selected from the group consisting of (1) and (2) below:
 (1) two diamines A and A' and
 (2) two dianhydrides B and B'
wherein either said two diamines A and A' or said two dianhydrides B and B', but not both, are the same and are selected so that
 the homopolymers formed from the imidized condensation reaction of A with B have a glass-transition temperature of ≧300° C., and
 the homopolymers formed from the imidization condensation reaction of A' with B' have a resistance to said solvent that is characterized by absorption of 24 50 wt % of said solvent in pure form at 20° C. for at least 24 hours, and
 said membrane support has a nitrogen permeance greater than $1 Nm^3/m^2.hr.atm$ and a selectivity for oxygen over nitrogen of less than 2; and
(b) a permselective coating on the surface of said asymmetric microporous membrane support.

21. The composite membrane of claim 20 wherein said membrane support is in the form of a hollow fiber and said permselective coating is placed on the inside surface of said membrane support.

22. The composite membrane of claim 20 wherein said membrane support is in the form of a hollow fiber and said permselective coating is placed on the outside surface of said membrane support.

* * * * *

UNITED STATES PATENT AND TRADEMARK OFFICE
CERTIFICATE OF CORRECTION

PATENT NO.    : 5,725,769                                            Page 1 of 1
DATED         : March 10, 1998
INVENTOR(S)   : Miller et al.

It is certified that error appears in the above-identified patent and that said Letters Patent is hereby corrected as shown below:

Column 2,
Line 46, delete "$\geq$" and substitute -- $\leq$ -- therefor.

Column 5,
Line 27, change "$X_1$" to -- $X_1'$ --.

Column 16,
Line 1, delete "24" and substitute -- $\leq$ -- therefor.

Signed and Sealed this

Second Day of July, 2002

Attest:

Attesting Officer

JAMES E. ROGAN
Director of the United States Patent and Trademark Office

UNITED STATES PATENT AND TRADEMARK OFFICE
CERTIFICATE OF CORRECTION

PATENT NO. : 5,725,769
DATED : March 10, 1998
INVENTOR(S) : Miller et al.

It is certified that error appears in the above-identified patent and that said Letters Patent is hereby corrected as shown below:

<u>Title page, Item [54] and Column 1, lines 2-3,</u>
delete "POLYMIDE" and insert -- POLYIMIDE --.

Signed and Sealed this

Ninth Day of August, 2005

JON W. DUDAS
*Director of the United States Patent and Trademark Office*